W. R. LANDFEAR.
Sewing Machine.
No. 16,281. Patented Dec. 23, 1856.
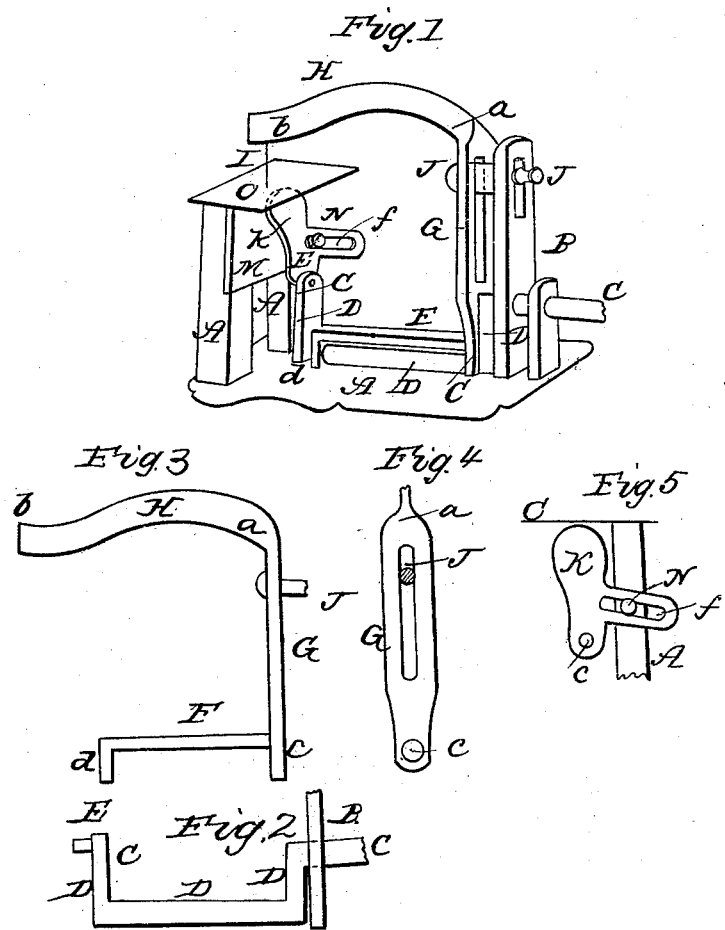

UNITED STATES PATENT OFFICE.

WM. R. LANDFEAR, OF MANCHESTER, CONNECTICUT.

IMPROVEMENT IN SEWING-MACHINES.

Specification forming part of Letters Patent No. 16,281, dated December 22, 1856.

*To all whom it may concern:*

Be it known that I, WILLIAM R. LANDFEAR, of Manchester, in the county of Hartford and State of Connecticut, have invented new and useful Improvements on the Sewing-Machine; and I do hereby declare that the following is a full, clear, and exact description of the construction and operation of the same, reference being had to the annexed drawings, making a part of this specification, in which—

Figure 1 is a view in perspective of the machine. Fig. 2 is a view of the shaft detached from the machine; Fig. 3, a side view of the bar for working the needle; Fig. 4, a rear view of the same; and Fig. 5, a rear view of the shuttle-guide, showing the manner of its connection with the frame.

This machine works with two threads, one carried by a needle and the other by a shuttle, thus forming the firm lock-stitch in the manner of the ordinary shuttle-machine.

A B is the frame to which the working parts are secured.

C is a shaft fitted in bearings in the standards of the frame. This shaft is bent in the form of the crank D, which extends nearly the whole length of the shaft. At the extremity of this crank farthest from the bearing in the standard B of the frame is another and shorter crank, E, as shown in Fig. 2. The two cranks D and E are on opposite sides of the center of shaft C, so that upon the revolution of the shaft one crank will descend while the other is rising.

To the crank D is attached a bar, F G, which carries the arm H, for the purpose of working the needle I. This bar is made flat at G, and furnished with a slot extending lengthwise, through which the pin J passes, thus securing it to the standard B of the frame. This slotted part G of the bar F G acts as a lever, to one arm of which the arm H is secured at *a*, the arm H extending over the top of the plate O. The needle I is secured to the arm H at *b*. The other arm of the lever is connected with the crank D, which passes through the lever or bar at *c*. The part F of the bar F G is made to extend over the crank D, and parallel with it the whole length of the crank, the end *d* being bent down for the crank to pass through. Thus the parts *c* and *d* form two sockets or bearings through which the crank D passes.

This is for the purpose of holding the lever G, and consequently the arm H, more firmly than would be possible with only similar bearings. The pin J acts as a fulcrum on which the lever plays as the shaft revolves.

To the crank E is attached the shuttle-guide K, the crank passing through this shuttle-guide at *e*. It is secured to one of the standards A of the frame by means of the screw or fulcrum N, which passes through the slot *f*. This slot is for the purpose of allowing the shuttle-guide to move freely on the fulcrum N as the crank E revolves, and gives a circular motion to that part of the shuttle-guide to which the crank is attached. By the above arrangement the shuttle-guide is caused to descend while the needle rises, carrying with it the shuttle, which may be in any convenient form, and may be attached to the shuttle-guide, near the top, in any proper manner, between it and the plate M, which is secured to the standards A A, and extends across the frame from side to side. Thus the under or shuttle thread is drawn in a direction nearly opposite to that in which the needle-thread is drawn when the stitch is tightened, instead of a direction at right angles with that of the needle-thread, as is often the case in other shuttle-machines. When the shaft C is rotated, the crank D on descending draws down the needle-bar F G H, carrying the needle through the cloth, which is laid on the plate O, the bar sliding on the fulcrum J. As the lower end of the bar is carried around by the crank, the needle I draws the cloth forward a short distance for a stitch. At the same time the crank E carries the shuttle-guide forward, carrying the shuttle through between the needle and the thread which it carries. The crank D now raises the needle and draws up the loop of thread through which the shuttle has passed, while the shuttle descends and draws the other thread tight. The length of stitch is regulated by raising and lowering the fulcrum J. When this fulcrum is at the same height as the plate O, the needle must enter the cloth in the same place in which it rises; but when the fulcrum is placed lower than the plate, thereby shortening the lower arm of the lever G and lengthening the upper arm, which carries the needle-arm H, the point of the needle is carried around so far as to enter the cloth a short distance from the place where it was retracted, this distance depending upon the difference between the height of the fulcrum and that of the plate O.

I do not claim the forming of the seam by means of the needle and shuttle, or the feeding of the cloth by the needle; but

What I claim as my invention, and desire to secure by Letters Patent, is—

1. The manner of regulating the length of stitch by raising and lowering the fulcrum J, thereby changing the relative lengths of the two arms of the lever G, as described.

2. The manner of combining the shuttle-guide K with the crank E and fulcrum N, for the purpose of giving the shuttle a downward motion when the stitch is tightened, in the manner set forth.

WILLIAM R. LANDFEAR.

Witnesses:
M. LANDFEAR,
L. LANDFEAR.